United States Patent [19]

Bykhovsky et al.

[11] Patent Number: 5,054,750
[45] Date of Patent: Oct. 8, 1991

[54] APPARATUS FOR METER-FEEDING AND HEATING OF MOLTEN METAL

[76] Inventors: David G. Bykhovsky, ulitsa Esenina, 32, korpus 2, kv. 95; Alexandr N. Panov, nabe rezhnaya reki Fontanki, 26, kv. 3, both of Leningrad, U.S.S.R.

[21] Appl. No.: 536,636

[22] PCT Filed: Oct. 28, 1988

[86] PCT No.: PCT/SU88/00217
§ 371 Date: Jul. 6, 1990
§ 102(e) Date: Jul. 6, 1990

[87] PCT Pub. No.: WO90/04880
PCT Pub. Date: May 3, 1990

[30] Foreign Application Priority Data

Dec. 17, 1987 [SU] U.S.S.R. ............... 4344540

[51] Int. Cl.$^5$ ............... C21C 5/42
[52] U.S. Cl. ............... 266/237; 222/591
[58] Field of Search ............... 266/236, 237; 222/591, 222/594, 252; 164/135

[56] References Cited

U.S. PATENT DOCUMENTS 4,230,241 10/1980 Eberle ............... 222/252

FOREIGN PATENT DOCUMENTS 0679783 8/1973 U.S.S.R. .
0582044 12/1977 U.S.S.R. .
1377628 12/1974 United Kingdom .
1391785 4/1975 United Kingdom .

Primary Examiner—S. Kastler
Attorney, Agent, or Firm—Burgess, Ryan and Wayne

[57] ABSTRACT

An apparatus for meter-feeding and heating of molten metal comprises a centrifugal conduction MHD-pump (1) installed in a metal body whereof coaxially therein this a cylindrical working chamber (4) communicating with a reservoir (2) with molten metal acted upon by a magnetic field induced by a magnetic system. The cylindrical working chamber (4) communicates with a container (11) by way of a pipe branch (8) for draining the molten metal and a connecting pipe (7), the hole in the body of the cylindrical chamber (4), through which the branch pipe (8) is connected to the chamber (4) being offset from the longitudinal central axis of the cylindrical working chamber (4) to a distance greater than the hole (14) the body of the chamber (4) through which the chamber (4) communicates with the pipe (7), whereas the interior of the container (11) is divided by a partition (13) into two communicating spaces, one of these spaces being associated with the outlet ends of the branch pipe (8) for draining molten metal and of the connecting pipe (7). A d.c. power source (17) is connected between the pipe (8) and molten metal in the reservoir (2).

3 Claims, 2 Drawing Sheets 5,054,750

APPARATUS FOR METER-FEEDING AND HEATING OF MOLTEN METAL

FIELD OF THE INVENTION

The present invention relates to metallurgy and foundry, and more particularly to apparatus for meter-feeding and heating of molten metal.

BACKGROUND OF THE INVENTION

Known in the art is an apparatus for automatic metering of molten metal from a bale-out furnace, comprising a metal conduit, a gas conduit and an alloy feed regulator made in the form of a gas pipe with one end thereof secured in the bale-out furnace, the other end coupled with a maximum pressure limiter, for instance, a tubular hydroseal, and the middle part associated with a gas source (SU, A, 582044).

The aforementioned prior art apparatus operates as follows.

In the initial position, the gas pressure in the bale-out furnace is equal to atmospheric, and the molten metal in the metal conduit is at the level of the bath free surface. As the gas pressure in the gas pipe increases, the gas bubbles through the molten metal, raising pressure in the bale-out furnace; as a result, the molten metal flows up the metal conduit to the preassigned level, which is subsequently maintained automatically constant, independently of the level of the molten metal in the bale-out furnace.

This apparatus assures automatic maintenance of the level of molten metal in the outlet portion of the metal conduit, irrespective of the level of molten metal in the bale-out furnace, which allows continuous metal casting.

This prior art apparatus, however, requires a pressure-tight bale-out furnace, a pressure-tight metal conduit outlet, and a pressure-tight gas pipe inlet, which makes the apparatus a batch-action arrangement, as an evacuated bale-out furnace must be depressurized, changed and re-pressurized.

Another prior art apparatus, intended for pumping out molten metal, comprises a centrifugal conduction MHD-pump placed in a reservoir with molten metal (SU, A, 67978). The MHD-pump includes a ceramic body with double walls, with a solenoid being located therebetween. A transverse partition divides the cylindrical space of the body into an upper and a lower spaces. The central part of the partition has a hole to communicate the body upper and lower spaces. The body upper space encloses a graphite electrode with a tip, and the working chamber is formed by the graphite electrode tip and the transverse partition. Molten metal from the reservoir is fed to the working chamber through the lower space in the body and the hole in the partition. Molten metal is drained through a suitable branch pipe located in the body upper space.

The apparatus also contains two d.c. sources, one of which promotes electric current flow through molten metal in the working chamber and the other serves to pass electric current through the solenoid.

Let us consider operation of the apparatus.

Metal in the reservoir is set as at a level whereat, with the power sources turned off, the working chamber is filled with molten metal. Voltage from a d.c. power source to pass electric current through the working chamber is supplied to the graphite electrode of the MHD-pump and an additional electrode located in the reservoir. The solenoid is also supplied with voltage from its own d.c. source. As a result, a magnetic field is induced in the working chamber, the field induction vector directed along the longitudinal axis of the working chamber. The direct current flowing through the molten in the working chamber interacts with the magnetic field produced by the solenoid, and sets the metal into rotation. The resultant pressure differential between the central inlet hole and the molten metal outlet branch pipe forces the metal into the latter.

The availability of two d.c. power sources makes it possible to control both the working current flowing through the molten metal in the working chamber and the current flowing through the solenoid.

It has been known that the pressure developed by the centrifugal conduction MHD-pump and also the capacity of the latter vary with the variation of both the strength of the electric current flowing through molten metal in the working chamber and the strength of the electric current flowing through the solenoid.

Therefore, the foregoing prior art apparatus for pumping out molten metal may be used for meter-feeding of molten metal into a mould, the control of the metering process boiling down to the control of the electric currents flowing through the molten metal in the working chamber and through the solenoid.

However, said prior art apparatus for pumping out molten metal is not pressure-tight and, consequently, can develop only a low pressure, its capacity drastically changes even with insignificant variation in the level of molten metal in the reservoir and, besides, it cannot be applied for heating of molten metal in a closed space while feeding metal into a mould.

SUMMARY OF THE INVENTION

The invention has for an object to provide an apparatus for meter-feeding and heating of molten metal, wherein the design of the working chamber of the centrifugal conduction MHD-pump and the design of the apparatus proper would ensure uninterrupted or meter-feeding of molten metal into a mould at a pre-assigned rate, independent of the metering accuracy on random fluctuations of the level of molten metal in the reservoir, and heating of molten metal in a closed space to the reference temperature of the casting process.

The foregoing object is attained by an apparatus for meter-feeding and heating of molten metal, comprising a centrifugal conduction MHD-pump installed in a metal body whereof coaxially therewith is a cylindrical working chamber communicating with a reservoir with molten metal, tightly coupled with a branch pipe for draining molten metal and acted upon by a magentic field induced by a magnetic system, and at least one d.c. power source connected between molten metal and the branch pipe for draining molten metal, according to the invention, the cylindrical working chamber is additionally provided with a connecting pipe and a hole in the body of the cylindrical working chamber through which the branch pipe for draining molten metal is tightly coupled with the cylindrical working chamber is offset from the longitudinal central axis of the cylindrical working chamber by a distance greater than the hole in the body of the cylindrical working chamber through which the cylindrical working chamber is tightly coupled with the connecting pipe, and the bottom of the cylindrical working chamber and the bottom of the metal body have central holes forming a channel through which the cylindrical working chamber communicates with the reservoir with molten metal and, besides, the apparatus is additionally provided with a container whose inner space is divided by a partition into two communicating space, one of the spaces being associated with the outlet ends of the branch pipe for draining molten metal and of the connecting pipe.

It is expedient to install in the spaces of the container associated with the outlet ends of the branch pipe for draining molten metal and of the connecting pipe, perpendicular to the available partition, another partition with the height smaller than the height of the available partition.

The apparatus may be provided with an a.c. source connected to the branch pipe for draining molten metal and the connecting pipe approximately at their middle.

The availability of the connecting pipe and the container with the partitions, and a suitable connection of the connecting pipe and the branch pipe for draining molten metal to the cylindrical working chamber and the container assure uninterrupted or meter-feeding of molten metal into a mould at a pre-assigned rate, independent of the metering accuracy on random fluctuations of the level of molten metal in the reservoir and heating of molten metal in a closed space to the reference temperature of the casting process.

Connecting an additinal a.c. power source to the branch pipe for draining molten metal and to the connecting pipe provides for an additional heating of molten metal in a closed space.

BRIEF DESCRIPTION OF THE DRAWINGS

The invention will now be described in greater detail with reference to a specific embodiment thereof taken in conjunction with the accompanying drawings, wherein.

BEST MODE OF CARRYING OUT THE INVENTION

Figure 1:
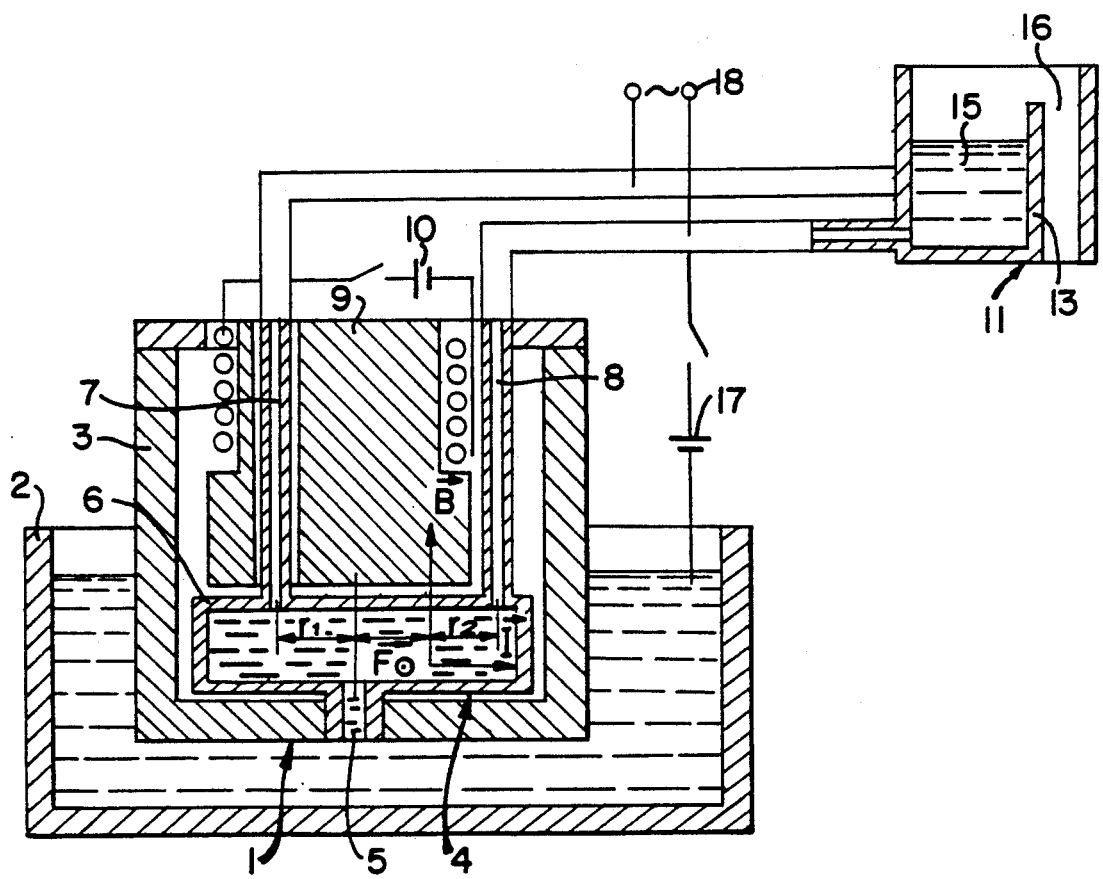
FIG. 1 illustrates a section of an apparatus for meter-feeding and heating of molten metal, according to the invention.

The apparatus for meter-feeding and heating of molten metal, according to the invention, comprises a centrifugal contuction MHD-pump 1 (FIG. 1) installed in a reservoir 2 with molten metal. The centrifugal conduction MHD-pump 1 contains a metal body 3 with a cylindrical working chamber 4 fitted inside it coaxially therewith. The bottom of the cylindrical working chamber 4 and the bottom of the metal body 3 of the MHD-pump 1 are provided with central holes forming a channel 5 to communicate the inner space of the cylindrical working chamber 4 with the reservoir 2 with molten metal. The cylindrical working chamber 4 is made of metal. A cover 6 of the cylindrical working chamber 4 has two holes located at different distances from the central longitudinal axis of the cylindrical working chamber 4, which are tightly coupled with a connecting pipe 7 and a branch pipe 8 for draining of molten metal, respectively.

The connecting pipe 7 is offset at a distance $r_1$ from the central longitudinal axis of the cylindrical working chamber 4, and the branch pipe 8 for draining molten metal is at a distance $r_2$ from the central longitudinal axis of the cylindrical working chamber 4, with $r_1 < r_2$.

The cylindrical working chamber 4 is acted upon by a magnetic field induced by a magnetic system 9, a vector $\bar{B}$ of magnetic induction being parallel to the longitudinal axis of the cylindrical working chamber 4. The magnetic system 9 is made in the form of a solenoid connected to a d.c. power source 10. the magnetic system may be made in the form of permanent magnets.

Figure 2:
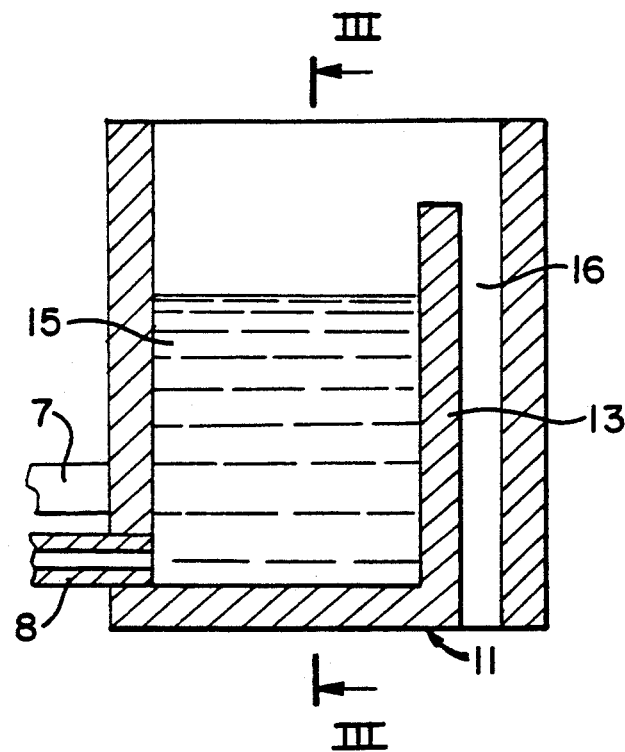
FIG. 2 is a container coupled with a branch pipe for draining molen metal and a connecting pipe.
Figure 3:
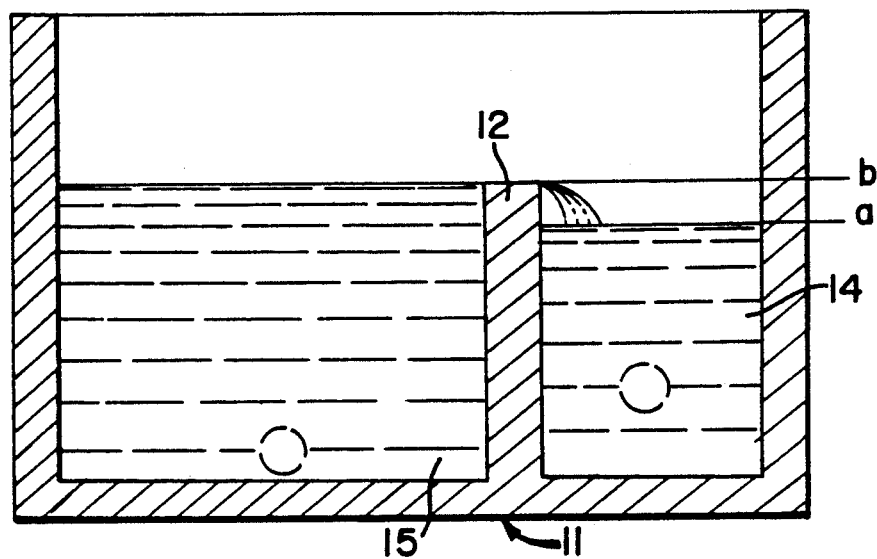
FIG. 3 is a section III—III in FIG. 2.

Besides, the apparatus is additionally provided with a container 11, with the outlet ends of the connecting pipe 7 and of the branch pipe 8 for draining molten metal tightly coupled thereto. Partitions 12 and 13 divide the container 11 (FIGS. 2, 3) into three communicating spaces 14, 15 and 16, the spaces 14 and 15 being respectively associated with the connecting pipe 7 and the branch pipe 8 for draining molten metal. The height of the partition 12 dividing the spaces 14 and 15 communicating with the pipes 7 and 8 respectively is smaller than that of the partition 13.

The branch pipe 8 for draining molten metal and molten metal in the reservoir 2 (FIG. 1) are connected to a d.c. power source 17 (the connecting pipe 7 may also be connected to the d.c. power source 17). For additional heating of molten metal the apparatus may also be provided with an a.c. power source 18 connected to the connecting pipe 7 and the branch pipe 8 for draining molten metal approximately at their middle.

Let us consider operation of the apparatus for meter-feeding and heating of molten metal.

As the d.c. power source 17 (FIG. 1) is turned on, an electric current $\bar{I}$ flows along the following path: molten metal in the reservoir 2—molten metal in the channel 5—molten metal in the inner space of the working chamber 4—branch pipe 8 for draining molten metal. With the electric current flowing through the molten metal in the inner space of the working chamber 4, the electric current vector $\bar{I}$ is directed along the radius of the cylindrical working chamber 4 strictly perpendicular to the longitudinal chamber thereof. Energizing the d.c. power source 10 makes the electric current flow through the solenoid 9 of the magnetic system; as a result, a magnetic field is produced in the working chamber 4, the induction vector $\bar{B}$ of the field being parallel to the longitudinal axis of the working chamber 4. As the electric current $\bar{I}$ interacts with the magnetic field having the induction vector $\bar{B}$, molten metal in the working chamber 4 is acted upon by a force $\bar{F}$ directed perpendicular to the drawing plane in FIG. 1. The force $\bar{F}$ rotates molten metal in the working chamber 4, as a result of which a pressure differential similar to that in an ordinary centrifugal pump is produced between the channel 5 to communicate the inner space of the working chamber with the reservoir 2 with molten metal and the pipes 7 and 8.

As is known, the pressure P (r) in the working chamber 4 of the centrifugal conduction MHD-pump 1 as a function of r—distance of the longitudinal axis of the working chamber 4—is expressed by the relationship $$P(r) \sim r;$$

therefore, with the connecting pipe 7 and the branch pipe 8 for draining molten metal located respectively at distances $r_1$ and $r_2$ from the central longitudinal axis of the of working chamber 4, pressure differential $\Delta p$ in the connecting pipe 7 and the branch pipe 8 for draining molten metal takes the form $$\Delta p \sim (r_2 - r_1)$$

The apparatus operates in two modes, depending on the value of the electric current 1 flowing through molten metal in the inner space of the working chamber 4 and the magnetic induction B.

In the first mode, the values I and B are selected in such a manner (FIGS. 2, 3) that the level "a" of molten metal in the space 14 is lower than the level "b" of molten metal in the space 15 determined by the height of the partition 12, and the pressure differential $\Delta p$ in the connecting pipe 7 and the pipe 8 for draining molten metal is higher than the pressure of a column of molten metal with a height equal to (b−a). As a result, molten metal from the space of the working chamber 4 (FIG. 1) flows to the space 15 along the branch pipe 8 for draining molten metal, and begins to overflow the partition 12 (FIG. 3) to enter the space 14, and thence returns to the working chamber 4 (FIG. 1) along the connecting pipe 7. It is notworthy that molten metal flow in the above circuit is feasible with definite values of the electric current I running through molten metal in the working chamber 4 and of the magnetic induction B and, namely, with values whereat the level of molten metal in the space 15 is above the upper part of the partition 12. As a result of constant circulation in the aforementioned circuit, molten metal retains a constant temperature exceeding the temperature of molten metal in the reservoir 2. This excess of the temperature of molten metal in the circuit over the temperature of molten metal in the reservoir 2 is provided due to the Joulean heat released in the branch pipe 8 for draining molten metal and in the working chamber 4 with the d.c. electric current I flowing therethrough from the d.c. power source 17. If required, the temperature of molten metal in the circuit may be additionally raised by connecting the a.c. power source.

The level "b" of molten metal in the space 15 does not depend on variations of the level of molten metal in the reservoir 2 as long as metal circulates and overflows the partition 12.

In the second casting mode, the magnitudes I and B increase to such values (FIG. 2) whereat the level of molten metal in the space 15 rises higher than the partition 13, and molten metal starts freely flowing therefrom into the space 16 and thence into a mould (not shown in the drawing). As the values I and B grow, molten metal in the connecting pipe 7 may flow towards the working chamber 4 (if the pressure in the connecting pipe 7 is lower than the static pressure of a column of molten metal at the level of the upper part of the partition 13), or not move altogether (if the pressure in the connecting pipe 7 is equal to the static pressure of a column of molten metal at the level of the upper part of the partition 13), or begins flowing from the working chamber 4 to the container 11 (if the pressure in the connecting pipe 7 is higher than the static pressure of a column of molten metal at the level of the upper part of the partition 13).

Thus, the apparatus for meter-feeding and heating of molten metal assures an uninterrupted or meter-feeding of molten metal into a mould at a pre-assigned rate, maintenance of the level of molten metal in the container independently of random fluctuations in the reservoir and, if need be, heating of molten metal in a closed space to the reference temperature of the casting process.

INDUSTRIAL APPLICABILITY

The invention may be used in the metallurgical industry for meter-feeding of an alloy, for instance, for pig casting, and also for maintaining a constant, independent of the level of molten metal in the reservoir level of molten metal in an additional container, which may be applicable in the process of continuous metal casting.

In a foundry, the invention may be used for meter-feeding feeding of molten metal into moulds, simultaneously heating, if need be, the metal in a closed space up to the reference temperature of the casting process.

In storage battery production, the invention may be applied for the casting of current taps and other parts of lead-acid storage batteries made of lead-base alloys.

We claim:

1. An apparatus for meter-feeding and heating of molten metal, comprising a centrifugal conduction MHD-pump (1) installed in a metal body (3) whereof coaxially therewith is a cylindrical working chamber (4) communicating with a reservoir (2) with molten metal, tightly coupled with a branch pipe (8) for draining molten metal and acted upon by a magnetic field induced by a magnetic system, and at least one d.c. power source (17) connected between molten metal and the branch pipe (8) for draining molten metal, wherein the cylindrical working chamber (4) is additionally provided with a connecting pipe (7) and a hole in the body of the cylindrical chamber (4) through which the branch pipe (8) for draining molten metal is tightly coupled with the cylindrical working chamber (4) is offset from the longitudinal central axis of the cylindrical working chamber (4) by a distance greater than the hole in the body of the cylindrical chamber (4) through which the cylindrical working chamber (4) is tightly coupled with the connecting pipe (7), and the bottom of the cylindrical working chamber (4) and the bottom of the metal body (3) have central holes forming a channel (5) through which the cylindrical working chamber (4) communicates with the reservoir (2) with molten metal and, besides, the apparatus is additionally provided with a container (11) whose inner space is divided by a partition (13) into two communicating spaces, and a side wall one of the spaces being associated with the outlet ends of the branch pipe (8) for draining molten metal and of the connecting pipe (7).

2. An apparatus for meter-feeding and heating of molten metal as claimed in claim 1, wherein installed in the space of the container (11) associated with the outlet ends of the branch pipe (8) for draining molten metal and or the connecting pipe (7), perpendicular to the available partition (13), is another partition (12) with the height smaller than the height of the available partition (13).

3. An apparatus for meter-feeding and heating of molten metal as claimed in claim 1, wherein provided with a.c. source (18) connected to the branch pipe (8) for draining molten metal and the connecting pipe (7) approximately at their middle.

* * * * *